Nov. 12, 1946.　　　A. DE MOTT　　　2,410,930
LAWN SPRINKLER
Filed July 10, 1945
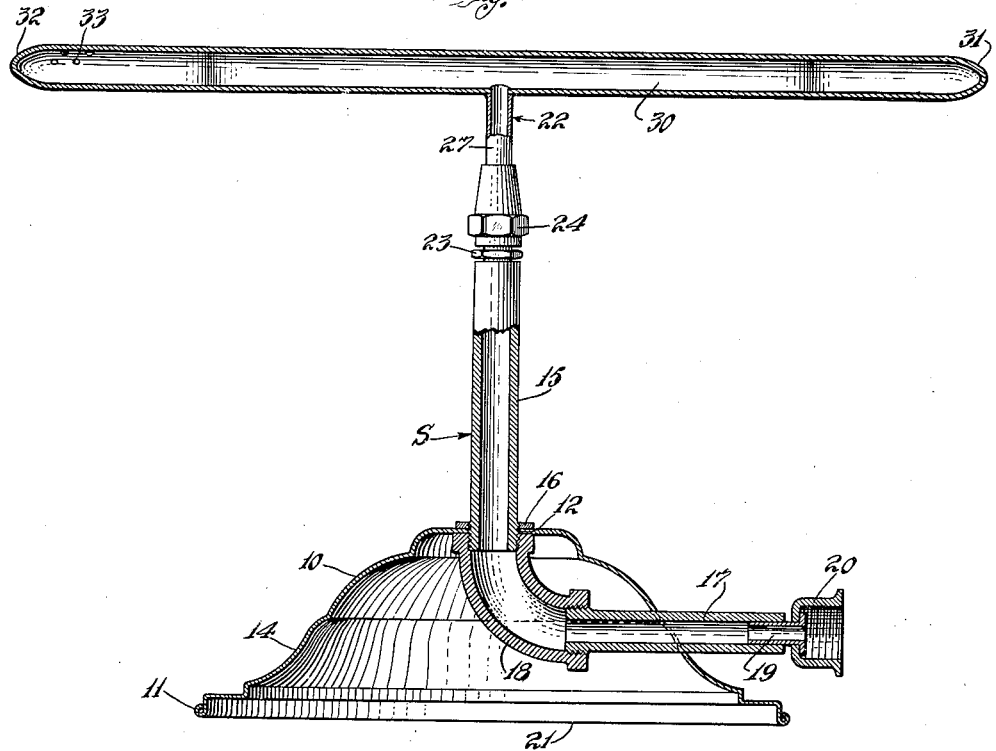
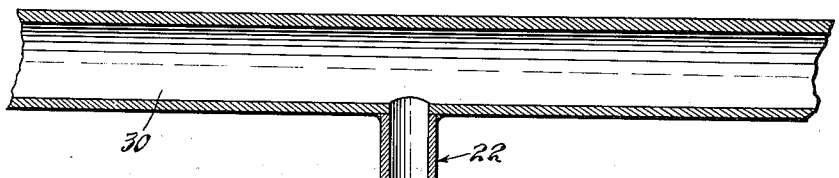
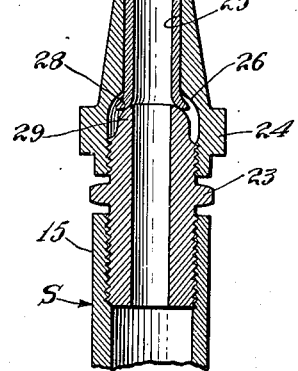
INVENTOR.
ARMAND DE MOTT
BY
ATTORNEY Patented Nov. 12, 1946

2,410,930

UNITED STATES PATENT OFFICE 2,410,930

LAWN SPRINKLER

Armand De Mott, Fords, N. J.

Application July 10, 1945, Serial No. 604,251

1 Claim. (Cl. 299—69)

This invention relates to improvements in lawn sprinklers. The object of the invention is to provide a lawn sprinkler to which a garden hose may be easily attached and detached, the sprinkler being adapted to automatically discharge water therefrom continuously in a circular path.

There have been many devices in the prior art directed to the objective above noted, but the structure herein disclosed provides for the attainment of that objective by the use of a sprinkler of improved construction and which is substantially fool-proof, positive and efficient in operation.

A further object of the invention is to provide a lawn sprinkler of the character described which may be rapidly manufactured, in large quantities, at low cost, from readily available, low-cost materials.

These and other advantageous objects, which will later appear, are accomplished by the simple and practical construction and combination of parts hereinafter described and more particularly shown in the accompanying drawing, illustrating embodiments of my invention, and in which:

Fig. 1 is a vertical elevational view of a lawn sprinkler embodying my invention, partly sectional, and Fig. 2 is an enlarged fragmentary, sectional view, of the upper portion of the device shown in Fig. 1.

In the drawing, the lawn sprinkler is shown to comprise essentially a base 10 which may be formed to define a relatively hollow member of generally semi-circular cross section, the lower edge 11 of which may be curled for reenforcement or ornamentation.

Intermediate its apex and lower edges, the base 10 may be provided with externally concave or convex portions 14 or the like for ornamentation, strengthening or other purposes.

A tube 15 is rigidly positioned in the aperture 12 at the apex of the base, said tube being preferably, as shown in the drawing, locked in said aperture by a lock nut 16 or the like. A second tube 17 is preferably disposed in the base 10 at right angles to the tube 15 by passing said tube 17 through an aperture in said base 10, the tube sections 15 and 17 being interconnected by any suitable means, such as by an elbow 18, within the base 10. The free end of the tube 17 projects from the base in substantially parallel relation with the lower edge of said base and is preferably provided with coupling elements 19, 20, by means of which a garden hose or the like may be coupled to the lawn sprinkler S. The tube 15, which is perpendicular to the lower edge 21 of the base 10, projects from said base for connection with the rotatable head 22 of the lawn sprinkler, said head 22 being preferably rotatably coupled to the tube 15 by coupling nut 24 and coupling 23 secured to the free end of said tube 15.

The nut 24 is secured to coupling 23 and is thus fixed to the tube 15 in axial alignment therewith, said coupling nut 24 having an internal apertured portion 25 terminating in an enlarged shouldered portion 26 interiorly of the coupling nut 24. The rotating head 22 comprises a stem portion 27, the free end of which is preferably outwardly flared as at 28 for free reception in the shouldered portion 26 of the nut 24 and intermediate the latter and the dome shaped portion 29 of the coupling 23, as shown in Fig. 2 of the drawing.

In the manufacture of the device, the stem 27 may be passed into the nut 24 and the free end 28 thereof may then be flared to the dimensions shown in Fig. 2, or some other suitable expedient may be resorted to for the same purpose.

The stem 27 is of hollow cross-section as shown in the drawing, and preferably terminates in a horizontal section 30 which is closed at the ends 31, 32 thereof. The horizontal portion 30 is likewise of hollow cross-section, and is provided with a series of apertures 33 disposed at opposite faces thereof adjacent the ends 31, 32.

The ends 31 and 32 of the horizontal section 30 of the head 22 are preferably laterally oppositely offset in the direction of the apertured faces thereof in a plane perpendicular to the axis of the tube 15, to further aid in imparting rotary motion to the head 22 responsive to the projection of water through said apertures 33.

By the arrangement described, when the lawn sprinkler S is coupled to a garden hose or is otherwise provided with a flow of water under pressure, the head of the lawn sprinkler will rotate automatically and in response to the discharge of the water through the oppositely disposed terminal apertures of the horizontal position of the sprinkler head. The sprinkler head rotates freely and smoothly, responsive to the flow of water therethrough.

The lawn sprinkler above described will thus be seen to be of essentially rigid, fool-proof structure. It may be made of any suitable inexpensive metals, alloys, plastics or other suitable materials.

All other modifications of the invention, within the terms of the appended claim, shall be deemed to be within the scope and purview of the invention.

In the form shown in Figs. 1 and 2 the upper end 29 of the coupling 23 is preferably formed of dome-shaped cross section to provide a seat for the flared end 28 of the stem 27 of substantially corresponding cross section therewith. Thus the flared portion 28 of the stem 27 is positioned intermediate the dome shaped portion 29 of the coupling 23 and the similarly shaped shoulder 26 of the nut 24 to provide for the easy rotation of the head 22 in the sprinkler.

Having thus described my invention what I claim as new and desire to secure by Letters Patent, is:

A lawn sprinkler comprising a base, tube means secured to and projecting from said base, said tube means having a dome-shaped end portion, a sprinkler head, a hollow stem on said head, said stem terminating in a flared portion, a coupling nut engaging said tube means and stem to secure the stem thereon, said coupling nut having an internally apertured portion in which the stem is rotatably positioned, said apertured portion terminating in an enlarged shouldered portion to freely receive the flared portion of the stem intermediate the shouldered portion of the nut and the dome-shaped portion of the tube means.

ARMAND DE MOTT.